Oct. 22, 1940.     G. L. BARNETT     2,218,946
LEADER FOR FISHING LINES
Filed Aug. 17, 1939
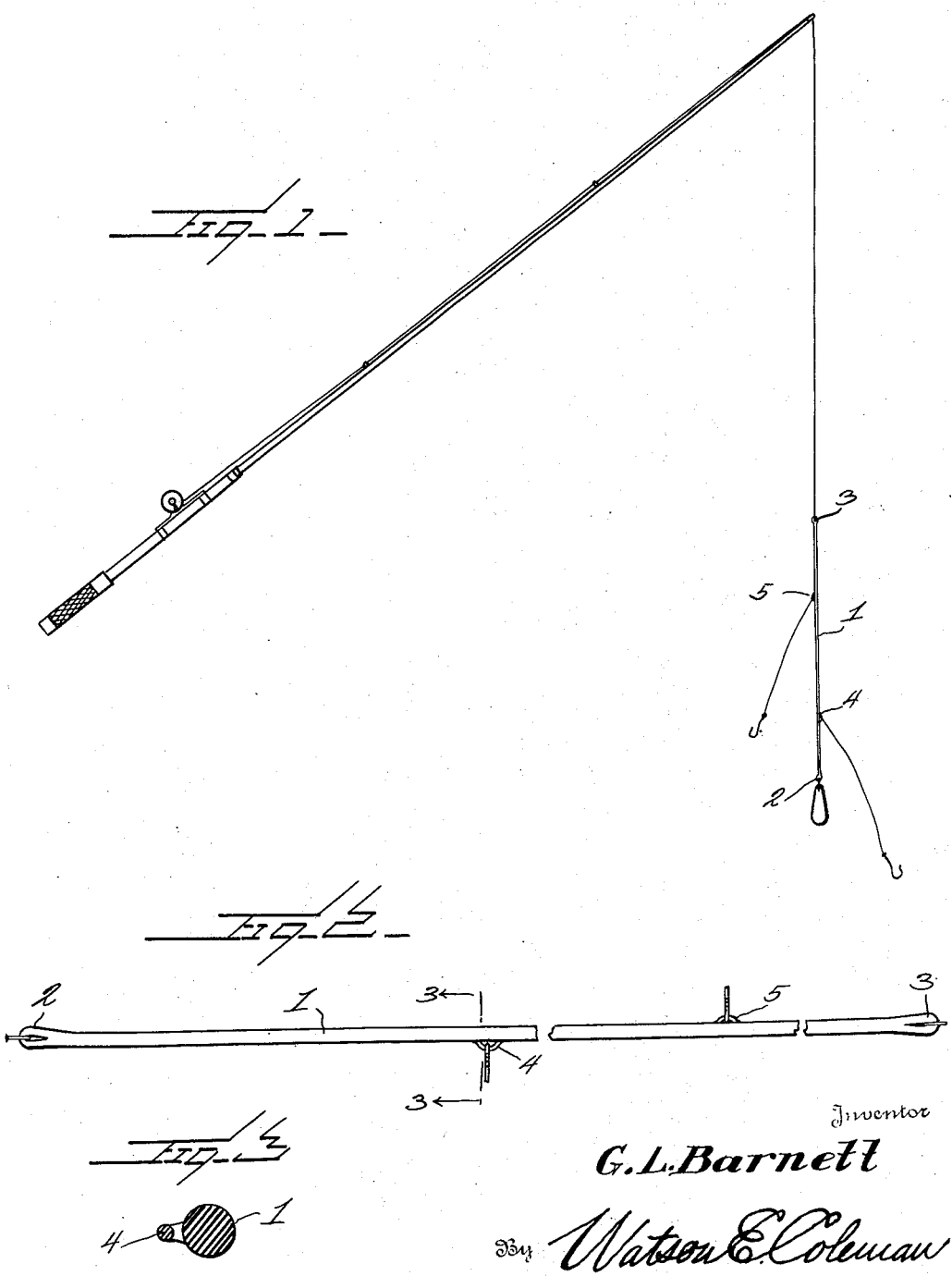

Patented Oct. 22, 1940

2,218,946

UNITED STATES PATENT OFFICE 2,218,946

LEADER FOR FISHING LINES

George L. Barnett, Millsboro, Del.

Application August 17, 1939, Serial No. 290,702

4 Claims. (Cl. 43—28)

This invention relates to a leader for a fishing line, and it is primarily an object of the invention to provide a leader of this kind which is elastic from substantially one end to the other.

Another object of the invention is to provide a leader of rubber or other elastic material not affected by oxidation in water and wherein the construction of the leader is such that it materially facilitates casting both as to distance and accuracy.

A further object of the invention is to provide a leader of this kind which serves to provide means to minimize sudden strain upon the mouth of a fish striking a hook carried by the leader, thus facilitating the catching of fish with tender mouths.

It is also an object of the invention to provide an elastic leader for a fishing line to compensate for the strain on the line when the hook is struck by a large fish and which strain otherwise might be likely to break the line.

The invention consists in the details of construction and in the combination and arrangement of the several parts of my improved leader as will be hereinafter more fully set forth.

The novel features of my invention will hereinafter be definitely claimed.

In order that my invention may be the better understood, I will now proceed to describe the same with reference to the accompanying drawing, wherein:

Figure 1 is a view in elevation illustrating a leader for fishing lines in applied position;

Figure 2 is an enlarged fragmentary view in plan of the leader as herein embodied;

Figure 3 is a sectional view taken substantially on the line 3—3 of Figure 2.

My improved leader for a fishing line as herein embodied is comprised of a strand 1 not less than eighteen inches in length and which is elastic from substantially one end to the other. This strand 1 is preferably circular in cross section to minimize air resistance when making a cast, and this strand 1 is preferably of a diameter approximating ⅛ of an inch. The strand 1 is also preferably of substantially the same diameter from one end to the other.

The extremities of the strand 1 are formed to provide the loops 2 and 3, each of which is comparatively small, the loop 2 being adapted to have connected thereto a lead from a sinker, while the loop 3 provides means whereby the fishing line proper may be securely attached to the leader.

At a point about four inches inwardly from the loop 2 the strand 1 is formed to provide a comparatively small and substantially rigid loop 4 extending outwardly and laterally therefrom a slight distance, and at a point substantially eight inches inwardly of the loop 4 the strand 1 is formed to provide a second relatively small and substantially rigid loop 5 extending outwardly and laterally from the strand 1 and substantially in a direction opposite to the loop 4. These loops 4 and 5 provide means whereby the leaders from fish hooks may be readily secured to the strand 1.

My improved leader including a strand 1 and the loops 2, 3, 4 and 5 constitute a single unit which is comparatively light in weight. It has been fully demonstrated in actual practice that with the use of my improved leader a fisherman may cast his line with accuracy and for a distance considerably in excess of what will be possible without the use of my improved leader. In the cast of the line the sinker attached to one end portion of the leader serves in the casting operation to initially afford such resistance to the leader as to cause the same to stretch, with the result that when the leader contracts added impetus is given to the cast.

It is also to be particularly pointed out that my improved leader is of a rubber compound affording desired elasticity yet possessing desired tensile strength. It is of particular advantage to have my improved leader made of such material, as the same will not be subjected to oxidation when in the water and, therefore, will retain its full efficiency for an indefinite period of time.

From the foregoing description it is thought to be obvious that a leader for a fishing line constructed in accordance with my invention is particularly well adapted for use by reason of the convenience and facility with which it may be assembled and operated, and it will also be obvious that my invention is susceptible to some change and modification without departing from the principles and spirit thereof and for this reason I do not wish to be understood as limiting myself to the precise arrangement and formation of the several parts herein shown in carrying out my invention in practice except as hereinafter claimed.

I claim:

1. As a new article of manufacture, a leader for a fishing line to facilitate casting comprising an elongated strand of elastic material freely stretchable in a direction of its length during a casting to impose impetus to the cast upon its retraction, said strand having means at one end for connection with a sinker, means at the opposite end for connection with the fishing line, and means at spaced points along the strand to allow for the attachment of fishing hooks.

2. As a new article of manufacture, a leader for a fishing line to facilitate casting comprising an elongated strand of material elastic from substantially one end to the other freely stretchable in a direction of its length during a casting to impose impetus to the cast upon its retraction, means at one extremity of the strand for attachment to a sinker, means at the opposite extremity for attachment with the fishing line, and substantially rigid loops carried by the strand at points spaced therealong to which fishing hooks are to be attached.

3. As a new article of manufacture, a leader for a fishing line to facilitate casting comprising an elongated strand of material elastic substantially from one end to the other freely stretchable in a direction of its length during a casting to impose impetus to the cast upon its retraction, means at one extremity of the strand for attachment to a sinker, means at the opposite extremity for attachment with the fishing line, and substantially rigid loops carried by the strand at points spaced therealong to which fishing hooks are to be attached, said loops being of a material the same as the strand, said loops extending laterally from the strand.

4. As a new article of manufacture, a leader for a fishing line to facilitate casting comprising an elongated strand of elastic material freely stretchable in a direction of its length during a casting to impose impetus to the cast upon its retraction, the opposite end portions of said strand being formed to provide loops, a sinker being adapted for connection with one of the loops, a fishing line being adapted for connection with the second loop, and intermediate loops carried by the strand to which fish hooks may be attached, said loops being substantially rigid.

GEORGE L. BARNETT.